GIBBS & SHAW.
Farm Gate.

No. 51,824.  Patented Jan'y 2, 1866.

UNITED STATES PATENT OFFICE.

LUTHER GIBBS AND HIRAM M. SHAW, OF FREMONT, OHIO.

IMPROVEMENT IN FARM-GATES.

Specification forming part of Letters Patent No. 51,824, dated January 2, 1866.

*To all whom it may concern:*

Be it known that we, LUTHER GIBBS and HIRAM M. SHAW, of Fremont, in the county of Sandusky and State of Ohio, have invented a new and Improved Mode of Constructing Farm and other Gates; and the following is a full, clear, and exact description of the same, reference being had to the accompanying drawings, made part of this specification, in which—

Figure 1:
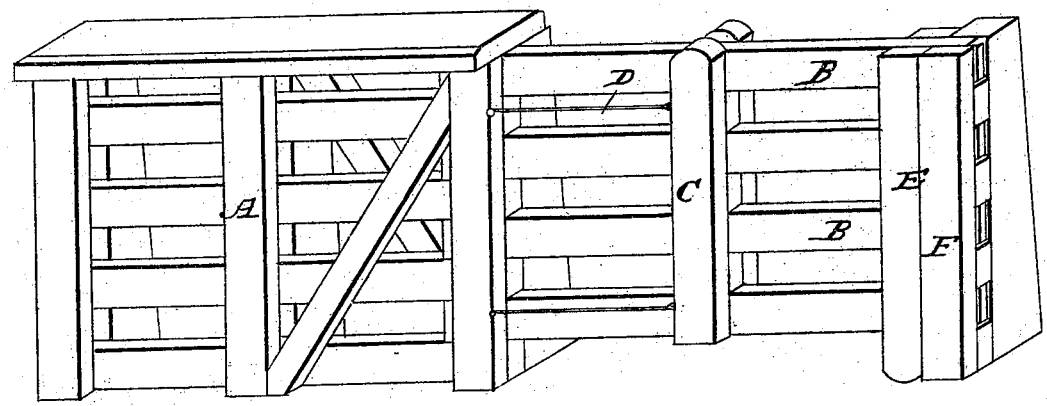
Figure 2:
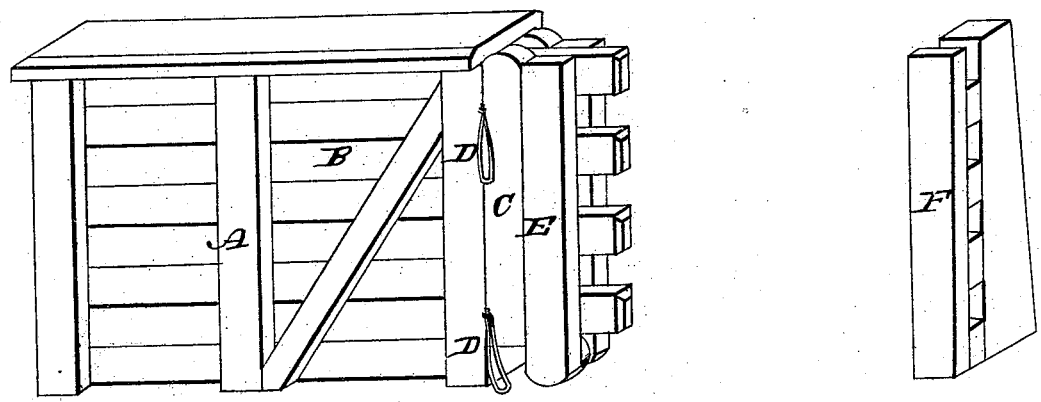

Figure 1 is a perspective view representing the gate when closed, and Fig. 2 is a perspective view representing the gate when open.

A represents the panel of fence adjoining the gate. It has two sets of posts, one on each side, to keep the boards firmly in place and prevent their warping, and also to guide the gate as it is slid back in opening it. The boards are smoothly planed on their edges, are put on parallel to one another, and a distance apart very slightly greater than the width of the planks or bars in the gate, so as to allow freedom of motion in sliding the gate in and out; B, the gate, slides freely in and out upon and between the boards in the panel A. The boards are smoothly finished upon their edges.

C is a brace hung upon the middle of the gate when closed, to prevent the boards from warping or being displaced. It is not fastened to the gate, but hung upon it, the bars of the gate sliding through the brace C when the gate is opened, as shown, Fig. 2.

D D are cords fastened by one end to the post, by the other to the brace C. When the gate is closed these cords stop the brace at the middle of the gate as the gate is closed.

The frame E stands on a wheel working on an iron rod or any other smooth way. The boards or bars project beyond the frame E and close into the post F, as shown.

The gate may be made single, as shown, or double, sliding each way from the middle.

Having fully explained our improvement, what we claim as our invention, and seek to secure by Letters Patent, is—

A sliding gate consisting of the bars B, which slide between the boards of the adjoining panel and fit snugly into the intervening spaces, the frame E, with its roller, the brace C, and cords D, all constructed and combined substantially as and for the purposes set forth.

In testimony whereof we have signed our names to this specification in the presence of two subscribing witnesses.

LUTHER GIBBS.
          HIRAM M. SHAW.

Witnesses:
  JOHN L. GREENE, Jr.,
  D. H. ALTOFFER.